(12) United States Patent
Giovanardi et al.

(10) Patent No.: US 11,065,930 B2
(45) Date of Patent: Jul. 20, 2021

(54) METHOD AND APPARATUS FOR ON-CENTER STEERING AND A FAST RESPONSE VEHICLE

(71) Applicant: ClearMotion, Inc., Billerica, MA (US)

(72) Inventors: Marco Giovanardi, Melrose, MA (US);
Matthew Jo Taylor, Kenilworth (GB);
Jaganath Chandrasekar, Woburn, MA (US)

(73) Assignee: ClearMotion, Inc., Billerica, MA (US)

( * ) Notice: Subject to any disclaimer, the term of this patent is extended or adjusted under 35 U.S.C. 154(b) by 292 days.

(21) Appl. No.: 16/094,681

(22) PCT Filed: Apr. 21, 2017

(86) PCT No.: PCT/US2017/028786
§ 371 (c)(1),
(2) Date: Oct. 18, 2018

(87) PCT Pub. No.: WO2017/184950
PCT Pub. Date: Oct. 26, 2017

(65) Prior Publication Data
US 2019/0126711 A1    May 2, 2019

Related U.S. Application Data

(60) Provisional application No. 62/326,679, filed on Apr. 22, 2016.

(51) Int. Cl.
*B60G 17/016*    (2006.01)
*B60G 17/02*    (2006.01)
(Continued)

(52) U.S. Cl.
CPC ....... *B60G 17/0164* (2013.01); *B60G 17/016* (2013.01); *B60G 17/018* (2013.01);
(Continued)

(58) Field of Classification Search
CPC .. B60G 17/0164; B60G 17/02; B60G 17/019; B60G 17/016; B60G 17/018;
(Continued)

(56) References Cited

U.S. PATENT DOCUMENTS 9,174,508 B2    11/2015    Anderson et al.
2009/0260935 A1    10/2009    Avadhany et al.
(Continued)

FOREIGN PATENT DOCUMENTS

JP    H04-331616 A    11/1992
JP    2008-137446 A    6/2008
(Continued)

OTHER PUBLICATIONS

International Search Report and Written Opinion dated Aug. 28, 2017 in connection with International Application No. PCT/US2017/028786.
(Continued)

*Primary Examiner* — Russell Frejd
(74) *Attorney, Agent, or Firm* — Wolf, Greenfield & Sacks, P.C.

(57) ABSTRACT

Presented herein are systems and methods for controlling a response (e.g., a roll, a pitch) of a vehicle body to a driver input. In one aspect, a method for controlling the response of the vehicle body is presented, the method comprising receiving an input (e.g., a steering wheel input, a pedal input) from an operator of a vehicle and modifying an aspect (e.g., a roll angle, a pitch angle, a roll rate, a pitch rate) of the response of the vehicle body, the modified aspect having a value based, at least partially, on the input. In another aspect, a controlled vehicle is presented comprising a vehicle body and one or more actuators configured to apply a torque to the vehicle body, the torque having a direction and/or magnitude based, at least partially, on a driver input
(Continued)

(e.g. steering command, braking command, and/or acceleration command).

20 Claims, 8 Drawing Sheets

(51) Int. Cl.
  *B60G 17/019* (2006.01)
  *B60G 17/018* (2006.01)
  *B60G 17/08* (2006.01)
  *B60T 8/1755* (2006.01)
(52) U.S. Cl.
  CPC ........ *B60G 17/019* (2013.01); *B60G 17/0161* (2013.01); *B60G 17/0162* (2013.01); *B60G 17/02* (2013.01); *B60G 17/08* (2013.01); *B60T 8/1755* (2013.01); B60G 2400/0521 (2013.01); B60G 2400/0522 (2013.01); B60G 2400/0523 (2013.01); B60G 2400/34 (2013.01); B60G 2400/39 (2013.01); B60G 2400/412 (2013.01); B60G 2400/822 (2013.01); B60T 2260/06 (2013.01)
(58) Field of Classification Search
  CPC ................ B60G 17/08; B60G 17/0161; B60G 17/0162; B60G 2400/0523; B60G 2400/0522; B60G 2400/0521; B60G 2400/34; B60G 2400/39; B60G 2400/412; B60G 2400/822; B60T 8/1755; B60T 2260/06
  See application file for complete search history.

(56) References Cited

U.S. PATENT DOCUMENTS

| | | |
|---|---|---|
| 2010/0017066 A1 | 1/2010 | Lu et al. |
| 2010/0072760 A1 | 3/2010 | Anderson et al. |
| 2010/0262308 A1 | 10/2010 | Anderson et al. |
| 2013/0079988 A1* | 3/2013 | Hirao .................. B60W 30/025 701/38 |
| 2014/0265168 A1 | 9/2014 | Giovanardi et al. |
| 2014/0297119 A1 | 10/2014 | Giovanardi et al. |
| 2015/0046034 A1 | 2/2015 | Kikuchi |
| 2015/0224845 A1 | 8/2015 | Anderson et al. |
| 2019/0023094 A1 | 1/2019 | Panagis et al. |

FOREIGN PATENT DOCUMENTS

| | | |
|---|---|---|
| JP | 2012-046172 A | 3/2012 |
| WO | WO 2006/126342 A1 | 11/2006 |
| WO | WO 2011/159874 A2 | 12/2011 |
| WO | WO 2014/145018 A2 | 9/2014 |
| WO | WO 2015/153811 A1 | 10/2015 |

OTHER PUBLICATIONS

PCT/US2017/028786, Aug. 28, 2017, International Search Report and Written Opinion.
U.S. Appl. No. 14/242,691, filed Apr. 1, 2014, Anderson et al.
U.S. Appl. No. 15/832,517, filed Dec. 5, 2017, Anderson et al.
U.S. Appl. No. 15/300,500, filed Sep. 29, 2016, Anderson et al.
U.S. Appl. No. 16/130,311, filed Sep. 13, 2018, Sridhar et al.

* cited by examiner

METHOD AND APPARATUS FOR ON-CENTER STEERING AND A FAST RESPONSE VEHICLE

This Application is a national stage filing under 35 U.S.C. 371 of International Patent Application Serial No. PCT/US2017/028786, filed Apr. 21, 2017, which claims the benefit of priority under 35 USC 119(e) of U.S. provisional application No. 62/326,679, filed Apr. 22, 2016, the entire contents of each of which are incorporated herein by reference in their entirety.

FIELD

Disclosed embodiments are related generally to vehicle response and more specifically to vehicle steering including on-center steering.

BACKGROUND

A significant portion of a vehicle's interaction with the occupants, especially the driver, is determined by control inputs produced by the steering wheel, the accelerator pedal and/or the brake pedal. The response to such inputs from these devices can vary significantly among vehicles.

SUMMARY

In some embodiments, a response of a vehicle to certain driver inputs or commands, provided by using, for example, the steering wheel and/or one or more pedals, such as the brake pedal and/or the gas pedal, may be produced, influenced or adjusted by the application of one or more active forces. These active forces may be applied, for example, by one or more actuators of an active suspension system to the body of a vehicle. In certain embodiments, the intervention of the active suspension system may cause the vehicle to appear more responsive to the driver of the vehicle than it would be without the application of the active force(s). In some embodiments, for example, a controller of a vehicle may determine the anticipated natural response of a controlled vehicle, at a certain operating condition, to one or more driver inputs. The controller may then utilize an active suspension actuator to modify the natural response of the controlled vehicle to produce a more desired forced response. This forced response may, for example, approach or duplicate the natural response of an actual or virtual target vehicle in one or more respects.

For example, in an embodiment, a vehicle controller may receive information about driver generated inputs and/or vehicular operating parameters including, for example, steering wheel position ($\delta$) from a steering wheel sensor, accelerator pedal position from an accelerator pedal position ($\alpha$) sensor, a brake pedal position from a brake pedal position sensor ($\beta$), drive or braking torque on the wheels, commanded or measured signals for steer-by-wire or rear steer systems, the first, second or higher time derivatives of such quantities, and/or vehicle speed from a sensor capable of determining vehicle speed. Based on one or more such parameters and such driver input information and information about the difference between the anticipated natural response of the controlled vehicle to these inputs and a desired target response, the controller may use one or more actuators of the vehicle to respond to the inputs by applying one or more active forces. The applied active force or forces may, for example, produce, modify or augment certain response indicators, such as for example, vehicle roll, heave and/or pitch parameters.

In some embodiments, under certain operating conditions, response indicators received by a driver may include roll and/or pitch parameters such as, for example without limitation, roll angle ($\phi$), roll angle rate ($\dot{\phi}$), roll angle acceleration ($\ddot{\phi}$), pitch angle ($\theta$), pitch angle rate ($\dot{\theta}$), pitch angle acceleration ($\ddot{\theta}$). In certain embodiments, these indicators may be a response to one or more steering and or pedal inputs, such as for example, steering wheel angle ($\delta$), rate of change of steering wheel angle ($\dot{\delta}$), acceleration of steering wheel angle ($\ddot{\delta}$). In certain embodiments, active suspension actuators may be used to produce, augment or modify one or more response indicators.

As used herein, the term "responsiveness" is understood to mean how quickly a vehicle's response to a driver-generated input is perceived by the driver.

As used herein, the term "active force" is understood to mean a force that is applied to a body in the direction of motion of the body at the point of application of the force, while the term "passive force" (or "damping force") is understood to mean a force that is applied to a body in a direction opposite the direction of motion of the body at the point of application of the force.

As used herein, the term "natural response" of a vehicle to a particular command or input by a vehicle operator is understood to mean the response of the vehicle in the absence or effectively in the absence of the application of an active force or forces to the vehicle body to, for example, induce, augment, and/or modify roll and/or pitch of the vehicle.

As used herein, the term "forced response" of a vehicle to a particular command or input by a vehicle operator is understood to mean, for example, roll and/or pitch of the vehicle that is augmented or modified by the application of one or more active forces.

As used herein, the term "controlled vehicle," unless context indicates otherwise, is understood to mean a vehicle where the active suspension system, of the vehicle, may be used to apply an active force or forces to induce or modify a roll and/or pitch moment on the vehicle body in response to a vehicle input. The active force or forces may be applied in response to a driver provided steering wheel and/or pedal input. The resulting roll and/or pitch moment may cause the controlled vehicle to move, at a particular operating condition, in a manner that will be perceived as more responsive to the driver input(s) than the natural response.

As used herein, the term "target response" of a vehicle to a particular command or input by a vehicle operator is understood to mean a desired response that may be faster than the natural response of a controlled vehicle. The target response may be defined based on, for example, previously obtained feedback from one or more vehicle occupants of the controlled vehicle itself, previously obtained response data from other vehicles (for example, similar or same model vehicles as the controlled vehicle), response data from a numerical model predicted performance of other vehicle models that may be considered to have a desirable response (e.g. the 2016 Ferrari 488GTB, or other vehicle with a similar response), the response of an actual target vehicle and/or the response of a virtual target vehicle with preselected response characteristics.

As used herein, the term "inner side" (or inside) with respect to a vehicle body involved in a turn is understood to mean: (a) the driver's side (in a car configured for US operation) when the vehicle is turned to the left (from the perspective of the driver); and (b) the passenger's side (in a car configured for US operation) when the vehicle is turned to the right (from the perspective of the driver). Likewise the "outer side" (or outside) with respect to a vehicle body involved in a turn is understood to mean: (a) the driver's side (in a car configured for US operation) when the vehicle is turned to the right (from the perspective of the driver); and (b) the passenger's side (in a car configured for US operation) when the vehicle is turned to the left (from the perspective of the driver). As used herein, a roll is said to be "positive" or "away" from a direction of a turn when the vehicle rolls such that the outer side of the vehicle body is lowered vertically relative to the inner side of the vehicle body (or, alternatively stated, when the inner side of the vehicle body is raised vertically relative to the outer side of the vehicle); a roll motion is said to be "negative" or "into" a turn, when the outer side of the vehicle body is raised vertically relative to the inner side of the body.

In one aspect, a method for controlling a response of a vehicle body of a controlled vehicle is disclosed, the method comprising: (a) receiving an input from a driver or a signal from a control system in the case of an autonomous or semi-autonomous vehicle; and (b) modifying an aspect of the response of the vehicle body, wherein: the response is at least one of a roll and a pitch; the aspect is at least one of a rate and a magnitude; and a value of the aspect is based at least partially on the input. In certain embodiments, modifying the aspect of the response of the vehicle body comprises: applying, by one or more actuators of an active suspension system of the controlled vehicle, a first force to the vehicle body. In certain embodiments, the input is a change in steering wheel angle commanding the vehicle to turn in a turning direction, and the first force is a torque in a direction away from the turning direction. In certain embodiments, the input is a change in steering wheel angle commanding the controlled vehicle to turn in a turning direction, and the first force comprises at least one of (e.g., at least one of, both of): (i) an upward force applied to a first corner of the vehicle body, the first corner located along an inner side of the controlled vehicle and (ii) a downward force applied to a second corner of the vehicle body, the second corner located along an outer side of the controlled vehicle. In certain embodiments, the input is a change in a brake pedal position thereby commanding the controlled vehicle to brake, and the first force is a torque causing a front end of the vehicle body to lower vertically with respect to a rear end of the vehicle body. In certain embodiments, the input is a change in a brake pedal position thereby commanding the controlled vehicle to brake, and the first force comprises at least one of (e.g., at least one of, both of): (i) an upward force applied to a first corner of the vehicle body, the first corner located in a front end of the controlled vehicle and (ii) a downward force applied to a second corner of the vehicle body, the second corner located in a rear end of the controlled vehicle. In certain embodiments, the input is a change in an acceleration pedal (e.g., gas pedal) position thereby commanding the controlled vehicle to accelerate (or decelerate), and the first force is a torque causing a rear end of the controlled vehicle to rise vertically with respect to a front end of the controlled vehicle. In certain embodiments, the input is a change in an acceleration pedal (e.g., gas pedal) position thereby commanding the controlled vehicle to accelerate, and the first force comprises at least one of (e.g., at least one of, both of): (i) a downward force applied to a first corner of the vehicle body, the first corner located in a front end of the controlled vehicle and (ii) an upward force applied to a second corner of the vehicle body, the second corner located in a rear end of the controlled vehicle. In certain embodiments, the vehicle body has a natural response to the input, and the first force has a direction equal to the direction of the natural response. In certain embodiments, the aspect is a rate and the response is a roll. In certain embodiments, the aspect is a rate and the response is a pitch.

In another aspect, a method for controlling a forced response of a body of a controlled vehicle to a command (e.g., a braking command, an acceleration command, a steering command) is disclosed, the method comprising: (a) receiving, measuring, estimating, or deriving the command to perform a first maneuver with the vehicle (e.g., to accelerate the vehicle in a forward direction, to decelerate the vehicle in a forward direction, to turn the vehicle in a first direction (e.g., left, right); (b) determining a direction of a natural response to the command, wherein the natural response includes at least one of roll, heave, and pitch motion; (c) applying, to the vehicle body by one or more (e.g., at least one, at least two, at least three, at least four) active suspension actuators, a first force (e.g., a linear force, a torque) in the direction of the natural response, thereby effecting the forced response (e.g., wherein the forced response comprises at least one of active roll, active heave, and active pitch motion). In certain embodiments, the first force is applied before the natural response begins but after the command is received. In certain embodiments step (b) further comprises: determining a natural rate (e.g., velocity) of the natural response, wherein the forced response has a rate faster than the natural rate. In certain embodiments, step (b) further comprises determining a natural magnitude of the natural response, wherein the forced response has a magnitude at least one of: equal to the natural magnitude, larger than the natural magnitude. In certain embodiments, the first maneuver has a duration lasting from a first point in time to a second point in time, and the method further comprises discontinuing application of the first force at a third point in time, wherein the third point is later than the first point and earlier than the second point. In certain embodiments, the first maneuver comprises a turn in a turning direction (e.g., left, right)) and the natural response includes roll away from the turning direction (i.e., wherein an outer side of the vehicle body is lowered with respect to an inner side of the vehicle body). In certain embodiments, the maneuver involves braking (e.g., deceleration in a forward direction) and the natural response is pitch in the forward direction (i.e., wherein a front end of the vehicle body is lowered with respect to a rear end of the vehicle body).

In another aspect, a method for controlling a forced response (e.g., an active roll, an active pitch, an active heave) of a vehicle body of a controlled vehicle (e.g., a vehicle comprising an active suspension system) to a particular command (e.g., a braking command, an acceleration command, a steering command) is disclosed, the method comprising: (a) receiving the particular command to perform a first maneuver with the controlled vehicle, wherein the particular command comprises at least one of: a steering command, a braking command, and an acceleration command; (b) determining, based on the particular command, a particular target vehicle body response (e.g., a target roll, a target pitch, a target heave) having a particular set of target aspects, wherein the particular set of target aspects comprises at least one of: a target direction (e.g., roll direction, pitch direction, heave direction), a target magnitude (e.g., roll magnitude, pitch magnitude, heave magnitude), a target rate (e.g., roll rate, pitch rate, heave rate); (c) determining, based on the particular target vehicle body response, a first force (e.g., a linear force, a torque); (d) applying, to the vehicle body by one or more (e.g., at least one, at least two, at least three, at least four) active suspension actuators, the first force (e.g., a linear force, a torque), thereby effecting the forced response of the vehicle body. In certain embodiments, the forced response comprises motion having an active direction equal to the direction of the particular target vehicle body response. In certain embodiments, the forced response comprises motion having an active rate equal to the rate of the particular target vehicle body response. In certain embodiments, the forced response comprises motion having an active magnitude equal to the magnitude of the particular target vehicle body response.

In certain embodiments, the aforementioned step (b) further comprises: obtaining a model (e.g., a set of rules, a set of functions) of a target vehicle comprising a target vehicle body, the model defining a target response of the target vehicle body as a function of at least one of: a reference steering command, a reference acceleration command, a reference braking command; and computing the particular target vehicle body response by evaluating the particular command against the model. In certain embodiments, the target vehicle has a passive or semi-active suspension system. In certain embodiments, the target vehicle has a first yaw inertia and the controlled vehicle has a second yaw inertia larger than the first yaw inertia. In certain embodiments, the aforementioned step (c) further comprises determining a natural response to the command, wherein the natural response has a second set of aspects comprising at least one of: a natural direction (e.g., roll direction, pitch direction, heave direction), a natural magnitude (e.g., roll magnitude, pitch magnitude, heave magnitude), a natural target rate (e.g., roll rate, pitch rate, heave rate); computing a difference between an aspect of the second set and an aspect of the first set; and determining, based on the difference, the first force. In certain embodiments, the first force is applied in the natural direction.

In another aspect, a method for controlling a forced response of a body of a vehicle (e.g., a vehicle comprising an active suspension system) to a steering command is disclosed, the method comprising: rotating a steering wheel of a vehicle to a first position at a first rate of rotation; determining, based on at least one of (e.g., at least one of, at least two of) the first position and the first rate, a first force (e.g., a linear force, a torque); and applying, to the vehicle body by one or more (e.g., at least one, at least two, at least three, at least four) active suspension actuators, the first force, thereby effecting the forced response (e.g., wherein the forced response comprises at least one of active roll, active heave, and active pitch motion). In certain embodiments, rotating the steering wheel causes the vehicle to turn left (e.g., driver's side in a vehicle configured for the United States), and the first force is a torque having a clockwise direction (i.e., clockwise as perceived by an observer located behind the vehicle). In other embodiments, rotating the steering wheel causes the vehicle to turn right (e.g., passenger's side in a vehicle configured for the United States), and the first force is a torque having a counter clockwise direction (i.e., counterclockwise as perceived by an observer located behind the vehicle.

In yet another aspect, a method for controlling a forced response of a body of a vehicle (e.g., a vehicle comprising an active suspension system) to an acceleration command is disclosed, the method comprising: changing the position of a pedal of the vehicle from a first position to a second position at a first rate of change, wherein the pedal is one of: an acceleration pedal (e.g., a gas pedal), a brake pedal; determining, based on at least one of (e.g., at least one of, at least two of) the first position, the second position, and the first rate, a first force (e.g., a linear force, a torque); and applying, to the vehicle body by one or more (e.g., at least one, at least two, at least three, at least four) active suspension actuators, the first force, thereby effecting the forced response (e.g., wherein the forced response comprises at least one of active roll, active heave, and active pitch motion). In certain embodiments changing the position of the pedal causes the vehicle to accelerate in a forward direction, and the first force causes a rear end of the vehicle to lower vertically with respect to a front end of the vehicle. In other embodiments, changing the position of the pedal causes the vehicle to decelerate in a forward direction, wherein the first force causes a front end of the vehicle to lower vertically with respect to a rear end of the vehicle.

In yet another aspect, a vehicle is disclosed, the vehicle comprising: a vehicle body, and a first set of one or more (e.g., one, two, three, four) active suspension actuators configured to apply a torque to the vehicle body in a clockwise direction (i.e., clockwise as perceived by an observer located behind the vehicle) in response to a steering command instructing the vehicle to turn to the left (i.e., driver's side in a vehicle configured for the United States).

In yet another aspect, a vehicle is disclosed, the vehicle comprising a vehicle body and a first set of one or more (e.g., one, two, three, four) active suspension actuators configured to apply a torque to the vehicle body in a counterclockwise direction (i.e., counterclockwise as perceived by an observer located behind the vehicle) in response to a steering command instructing the vehicle to turn to the right (i.e., passenger's side in a vehicle configured for the United States).

BRIEF DESCRIPTION OF THE DRAWINGS

The foregoing summary, including the above and other features and advantages of the vehicle active suspension or other control systems and methods, as well as a brief description of the preferred embodiments of the inventions will be better understood when read in conjunction with the appended drawings. For the purpose of illustrating one or more embodiments of the present inventions, and to explain their operation, drawings and schematic illustrations are shown. It should be understood, however, that the invention(s) are not limited to the precise arrangements, variants, structures, features, embodiments, aspects, methods, advantages, improvements and instrumentalities shown, and the arrangements, variants, structures, features, embodiments, aspects, methods, advantages, improvements and instrumentalities shown and/or described may be used singularly in the system or method or may be used in combination with other arrangements, variants, structures, features, embodiments, aspects, methods.

In the drawings.

DETAILED DESCRIPTION OF EMBODIMENTS

Figure 1:
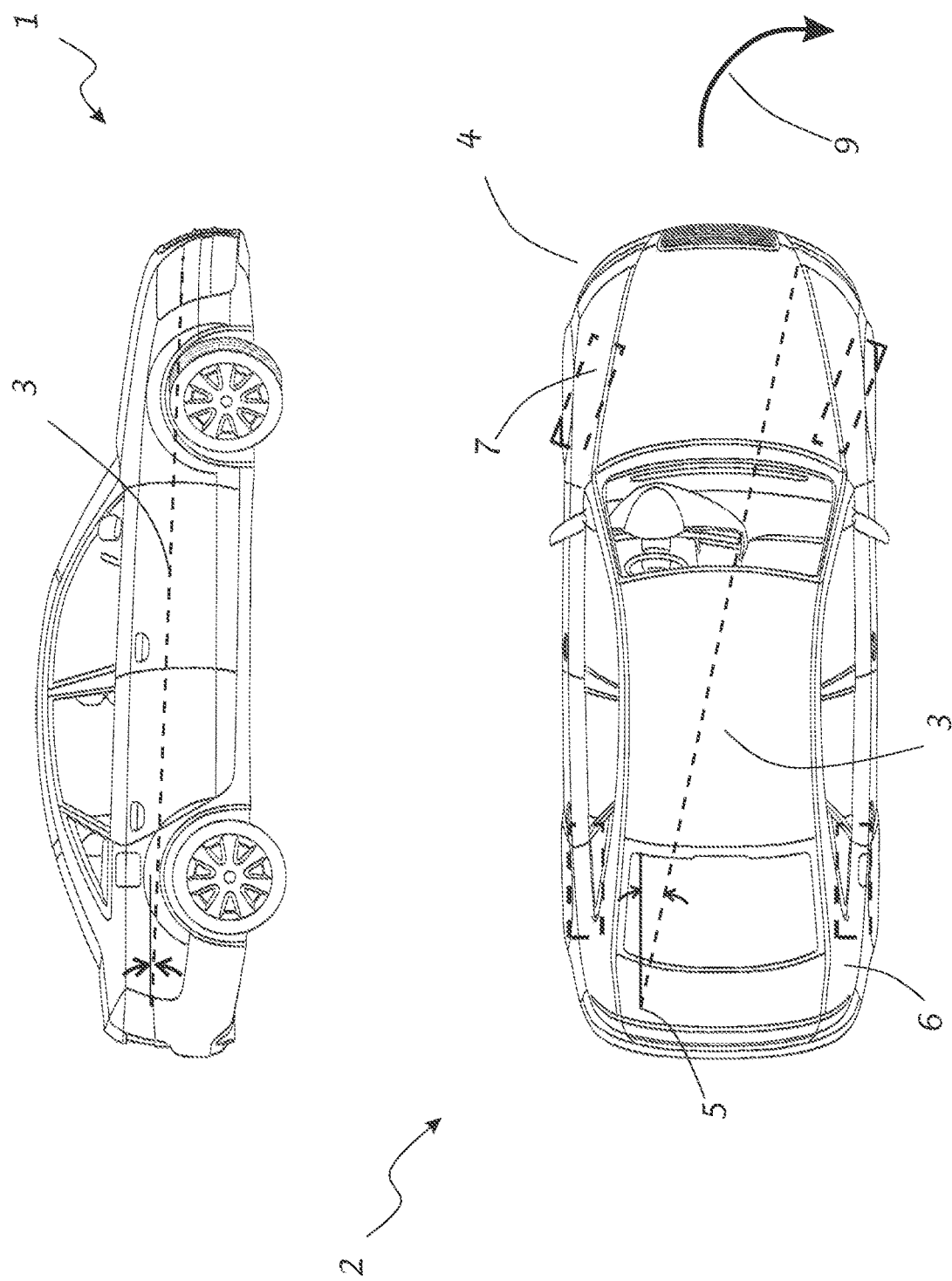
FIG. 1 illustrates a schematic representation of the top and side view of a vehicle responding to a steering wheel angle input.

Certain exemplary embodiments will now be described to provide an overall understanding of the principles of the structure, function, manufacture, and use of the system and methods disclosed herein for a vehicle response control system. One or more examples of these embodiments are illustrated in the accompanying drawings and described herein. Those of ordinary skill in the art will understand that the systems, methods and examples described herein and illustrated in the accompanying drawings are non-limiting exemplary embodiments and that the scope of the present invention is defined solely by the claims. The features illustrated or described in connection with one exemplary embodiment may be combined with features of other embodiments and the features may be used individually, singularly and/or in various combinations. Such modifications are intended to be included within the scope of the present disclosure.

An important and sought after aspect of a modern vehicle is its ability to respond promptly and predictably to input commands from the driver, such as for example, steering wheel, accelerator, and/or brake pedal inputs. These inputs may induce acceleration of the vehicle body in one or more directions and expose the vehicle and the occupants to certain inertial forces.

The inventors have recognized through experimentation and analysis that a driver's perception of a vehicle's responsiveness may be at least partially dependent on one or more response indicators, detected or felt by the driver, but that result from an input that is generated by the driver. For example, when a driver generates a steering input by turning the steering wheel of a vehicle, the driver may sense lateral acceleration of the vehicle. In a responsive vehicle, this sensed indicator comes about quickly and may be highly damped, meaning it does not persist long after the input ceases to change. For example, in some embodiments a highly responsive vehicle may have a natural frequency in the roll direction of up to 5 Hz with near critical damping factor of at least 0.7, while a non-responsive vehicle may have a frequency of approximately 1.5 Hz and a damping factor of approximately 0.4 or less. It is understood that natural frequencies and damping factors may be exhibited by responsive and nonresponsive vehicles that are outside the ranges noted above for each type of vehicle, as the disclosure is not so limited. The inventors have recognized that drivers may perceive the response of the vehicle to driver inputs in a number of different ways. For example, in certain embodiments, the natural response of a vehicle may result in a sensation of lateral or fore-aft acceleration, and/or sensation of change of roll and/or pitch angles of the vehicle as well as the rates at which these quantities change and/or the derivative of the rates of change may be sensed by a driver and interpreted as a response indicator to a steering and/or pedal commands. A driver may perceive the length of time between when an input command is given and a particular response indicator is sensed as a measure of the responsiveness of a vehicle.

The perceived responsiveness of vehicles may vary over a wide range where, for example, a 2016 Ferrari 488GTB or vehicles with comparable responsiveness may be considered to be highly responsive, a 2016 BMW 5 series or vehicles with comparable responsiveness may be considered to be moderately responsive, and a 2016 Lincoln Navigator or vehicles with comparable responsiveness may considered to have poor responsiveness.

Inventors have also recognized that, in certain embodiments, regardless of the actual natural response of a vehicle, the perceived response of a vehicle to driver generated commands may be improved by using one or more actuators to at least temporarily induce, alter, or augment roll, heave and/or pitch moments applied to the vehicle body.

The inventors have further recognized that many drivers also find it reassuring and/or desirable when a vehicle's response is perceived as being in a linear or proportional relationship with the driver's command input. For example, in the case of steering commands, drivers prefer steering systems that have a "V" shape steering response, where the vehicle's response is directly proportional to the steering angle input, rather than a "U" shape where the response is a non-linear function of the steering input, with the response defined as comprising, for example, one or more of: the sensed response indicators described above, and other indicators such as hand wheel torque, hand wheel torque rate, and audible response from power steering systems.

Through experimentation, inventors have recognized that an active suspension system of a vehicle may be used to rapidly provide certain response indicators that will be perceived by a driver. By providing one or more such indicators, a vehicle may be made to appear much more responsive. In certain embodiments, the response indicator may be directly proportional to a driver input. For example, in certain embodiments, if the response indicator is vehicle roll angle and the driver input is a steering wheel angle, the roll angle may be directly proportional to the negative of steering wheel angle.

In some embodiments, an active suspension system may be used to improve the on-center steering feel and/or behavior of the vehicle. For example, when a driver changes the steering wheel angle in order to properly center the vehicle in a lane, the active suspension actuators may be used to provide indicators to the driver that are commensurate with the steering input.

The timing magnitude and duration of the application of the active force to the vehicle body by employing an active suspension system may depend on the vehicle's natural response and the defined target vehicle response.

The inventors have recognized through experimentation and analysis that a driver's perception of a vehicle's responsiveness may be at least partially dependent on one or more response indicators, detected or felt by the driver, that result from an input that is generated by the driver. For example, when a driver generates a steering input by turning the steering wheel, the driver may sense lateral acceleration of the vehicle. In a responsive vehicle, this sensed acceleration indicator comes about quickly and is highly damped, meaning it does not persist long after the input ceases to change. For example, in some embodiments a highly responsive vehicle may have a natural frequency in the roll direction of up to 5 Hz with near critical damping factor of at least 0.7, while a non-responsive vehicle may have a frequency of approximately 1.5 Hz and a damping factor of approximately 0.4 or less. It is understood that natural frequencies and damping factors may be exhibited by the responsive and nonresponsive vehicles that are outside the ranges noted above for each type of vehicle, as the disclosure is not so limited.

In certain vehicles, the suspension system may be tuned so that the outside front corner dips when the vehicle is turning. For example, the suspension of a passive or semi-active vehicle may be tuned such that during a turn the vehicle is made to roll and pitch simultaneously. This gives the driver the impression that a vehicle's outside front end is "dipping" during a turn while the entire vehicle may be undergoing positive roll. In certain vehicles, this dipping motion may serve as a response indicator.

In a vehicle, a more immediate roll moment transfer may be created on the rear axle through a high instantaneous roll center, and a less immediate transfer in the front axle through a lower instantaneous roll center. Additionally or alternatively, passive or semi-active front dampers with asymmetric damping ratios may be used. This allows the dampers to be "softer" in one direction (typically in the direction that shortens the damper, or compression) and "stiffer" in the opposite direction, thus causing the corner of the car that is moving downward to move more aggressively than the corner of the car that moves upward. This means that the vehicles' initial response to a steering input is a roll acceleration about an axis (the instantaneous roll axis of the vehicle) that is typically inclined downward and to the inside of the turn. In other words, the outside front corner of the vehicle will dip down at the beginning of a turn. A desired amount of preferential dip of the vehicle front towards the outside of a turn may be achieved by "tuning" of the dampers and the suspension system of a vehicle with passive suspension.

However, in certain vehicles, there may be a significant inherent lag in when the vehicle responds dynamically to driver inputs. In these situations, the driver may not receive sufficient response indicators quickly enough to gauge the adequacy or appropriateness of the inputs provided by the driver. When a driver is unable to receive, for example, visual, tactile, and/or somatosensory response indicators quickly enough, the driver may lack a sufficient feedback mechanism and the effective control of the vehicle may become difficult.

When a vehicle's response to driver inputs is inherently slow and non-linear in general, the driver may be forced to constantly overcompensate, by for example, constantly changing the steering angle, overreact, and then struggle to correct the input. For example, the response of a vehicle with excessive lash in the driving mechanism may appear "sluggish" and non-linear. Even vehicles with normally a fast response may appear sluggish if the vehicle has a partially deflated tire (leading to a perception of "wandering") or with a depleted shock absorber (leading, for example, to a disproportionate roll response).

Even if the vehicle's response is predictable, but is perceived by the driver as not being so or as being too slow, it may lead to the driver to feel disconnected from the vehicle and unable to predict when a particular input is sufficient and/or appropriate. The lack of sufficient feedback may lead to endless correction and re-adjustment. During longer drives this may lead to operator fatigue and may increase the likelihood of accidents.

Inventors have recognized through experimentation that a driver's perception of how the vehicle is responding may, in certain situations, be more important than the actual response of the vehicle.

Inventors have recognized through experimentation that in vehicles equipped with active suspension systems, actuators may be used to provide a driver with certain response indicators that may serve as effective feedback to driver inputs. These indicators may substitute for, or augment, other slower feedback. These substitute indicators may include, for example, various combinations of vehicle roll, vehicle pitch, and/or the first, second, and/or higher order derivatives of roll and/or pitch.

In certain vehicles, the above mentioned natural dipping motion may occur after a significant delay in which case it may not serve as an effective response indicator. In a vehicle equipped with active suspension, actuators may be used to force a faster and/or magnified dipping response. This altered dipping response to driver inputs may make the vehicle appear more responsive to the driver.

FIG. 1 illustrates a side view 1 and top view 2 of a vehicle that is equipped with an active suspension system. In certain embodiments, the orientation of the roll axis 3 of the vehicle may be governed by the suspensions elasto-kinematics, but in an active suspension vehicle may be made to appear to, for example, produce a desired dipping motion of the front left corner 4 of the vehicle in response to a steering wheel input (which causes at least the front wheels 7 to turn) commanding a right hand turn 9 of the vehicle. One or more actuators of the active suspension system may be used to induce this motion in response to the driver steering wheel input. For example, a first actuator located at or near the front left corner 4 of the vehicle may apply a vertically downward force on the vehicle body, while a second actuator located at or near the rear right corner 6 of the vehicle may simultaneously apply a vertically upward force on the vehicle body. The timing and magnitude of the dip may be determined based on, for example, data previously collected from the controlled vehicle, other similar vehicles, a target vehicle and/or simulation models to define a desired response.

The inventors have also recognized through experimentation that in certain situations one or more actuators of an active suspension system may be used to induce a forced roll and/or pitch response that may be independent of the instantaneous lateral and/or fore-aft acceleration of the vehicle. This forced response may also make a vehicle appear more responsive when used in conjunction with, or as an alternative to, the dipping motion described earlier.

Inventors have recognized through experimentation and analysis that, in some embodiments when roll motion is absent, delayed, or insufficient, because of, for example, roll suppression by an active suspension system and/or a very stiff passive or semi-active suspension, the perception of the driver may be that the vehicle is less responsive. Therefore, using an active suspension system to keep a vehicle effectively at zero roll may be counterproductive with regard to the perceived responsiveness of the vehicle. This perception may be due to the lack of roll acceleration of the vehicle in the positive direction, which may impart a lateral force to the driver's side and/or upper torso. The driver may perceive a change in pressure against the seat or other surfaces to be a response indicator to a driver input.

Experiments have been conducted by comparing a vehicle equipped with an active suspension configured to suppress vehicle roll to the same vehicle with the active suspension configured to allow positive vehicle roll. In general, the vehicle with the active suspension configured to allow positive vehicle roll was perceived to be more responsive. Inventors have recognized that, in some embodiments, the perception of lateral acceleration may be augmented or substituted by a timed roll acceleration introduced by an active suspension system.

In certain embodiments, inputs such as, for example, steering wheel and/or pedal commands are received by a controller in communication with one or more actuators of an active suspension system, and the controller may command certain actuators to apply active forces on the vehicle body in response to the inputs. As used herein, a controller is understood to mean a set of one or more integrated circuits (e.g., processors), associated software, and/or associated electronic circuitry that is capable of receiving one or more input signals and transmitting or applying one or more output signals based on the received input signals. In some embodiments, with an active suspension system, properly timed and proportioned motion may be induced in response to a steering input and/or other driver input. This response may be perceived by the driver and/or other occupants as the response of a "quicker" vehicle. Such motion induced with an active suspension system may be used to at least partially compensate for observed or anticipated slowness of the natural response of a vehicle.

As elaborated on further below, in some embodiments, a natural roll and/or pitch response of the motion of the vehicle may be induced by inertial forces in the lateral and or fore-aft directions. This natural response may be modified by one or more active suspension actuators to produce a forced response. These active suspension actuators may act in response to input commands by a driver that may be provided during driving maneuvers, such as for example and without limitation, steering to stay centered in a lane and/or navigating a right or left turn. In some embodiments, forces applied by the actuator(s) during a maneuver may be used to alter a driver's perception of the responsiveness of a vehicle to steering and/or pedal inputs.

Figure 2:
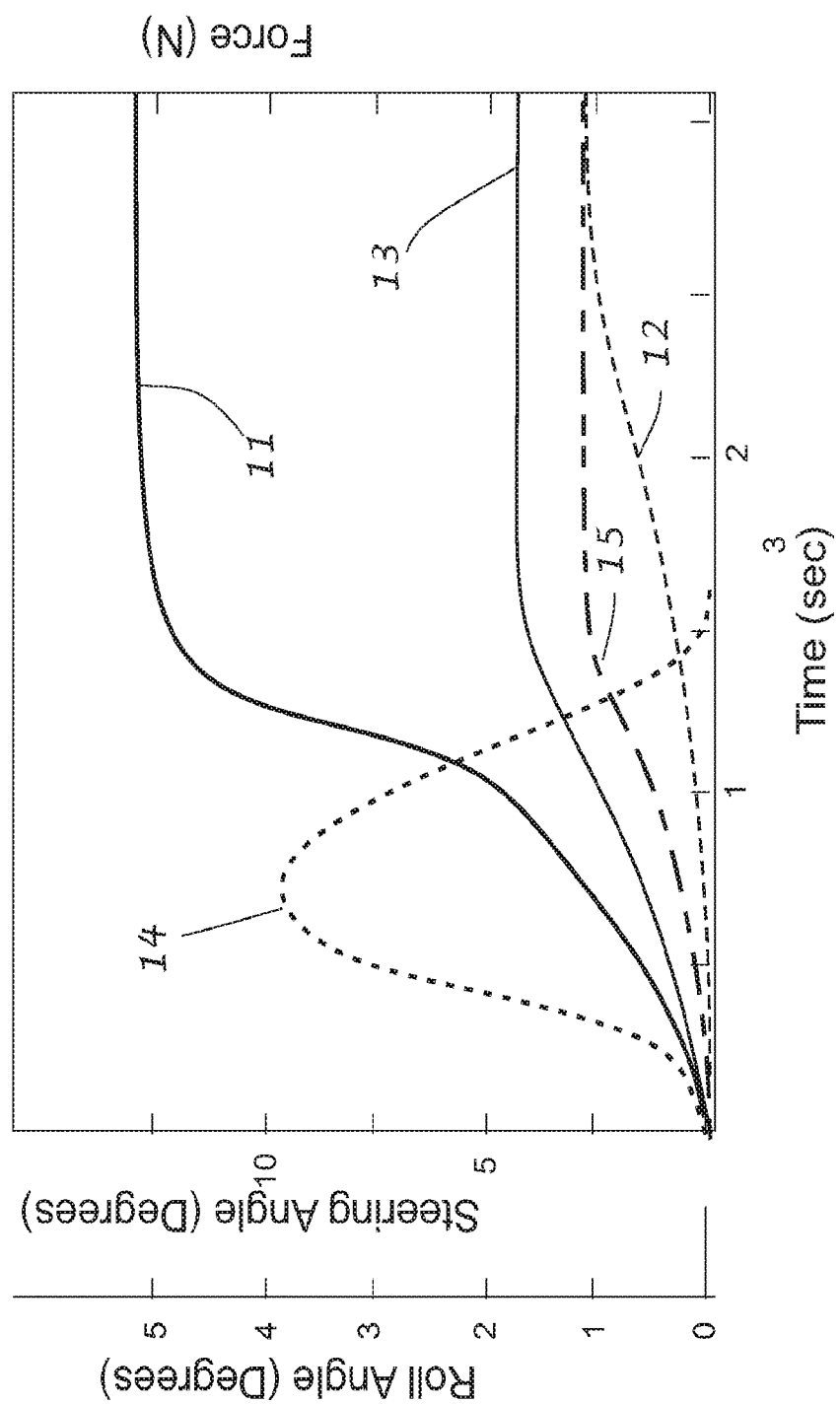
FIG. 2 illustrates a driver input of steering wheel angle in an exemplary controlled vehicle and roll angle responses of the controlled and target vehicles.

Now turning to FIG. 2, graph 11 represents an exemplary driver steering wheel angle (δ) input of a controlled vehicle as a function of time for a particular operating condition. Graph 12 represents the natural roll angle (φ) response as a function of time at the particular operating condition of the controlled vehicle. Graph 13 represents the natural roll angle (φ) response as a function of time at the same operating condition of a target vehicle. It is noted that in certain embodiments the final roll angle (e.g. at 3 seconds shown in FIG. 2) of the target vehicle may be equal to or less than the final roll angle of the controlled vehicle. The target vehicle may represent a vehicle with desirable response characteristics, such as, for example, a vehicle with less yaw inertia or with tires with a higher cornering coefficient. Graph 14 represents an active force that may be applied to the controlled vehicle body in order to more rapidly increase the roll angle in the positive direction, at least at the start of roll, and to produce the forced response 15, of the controlled first vehicle. It is understood that in certain embodiments the forced response 15 of the controlled vehicle may be equivalent or identical to the natural response 13 of the target vehicle. In the embodiment and operating condition illustrated in FIG. 2, the steady state roll angle achieved with the forced response is equal to the steady state roll angle achieved with the natural response of the vehicle, which in some embodiments may be a desirable outcome in order to minimize steady-state force output from the active suspension.

In certain embodiments, when a controller receives an input that the steering wheel has been rotated and/or the extent of the rotation, it may command one or more actuators of an active suspension system to apply a force to augment the natural roll, and/or other response, induced by inertial forces for a period of time. The application of the active force may be discontinued (e.g. gradually, abruptly) after a period of time, or it may be maintained during an entire maneuver. For certain embodiments and/or operating conditions the steady state roll angle of the forced response may be greater than or less than the steady state roll angle of the natural response. In order to maintain the steady state roll angle for the forced response that is different from the steady state of the natural response, a steady state moment may be applied by using the active suspension system.

As noted above, in some embodiments, one or more of the actuators may be used to apply one more active forces to the controlled vehicle to create a desired forced vehicle response. Depending on the embodiment, the active forces may be applied before the start of a maneuver, during the entire maneuver and/or only during a portion of the maneuver as the disclosure is not so limited. Further, in some embodiments, the active force(s) may be discontinued under certain conditions, for example, when it is no longer necessary to maintain the amount of heave, pitch and/or roll, or if it is no longer desired to maintain the heave, pitch and/or roll. The active forces may also be discontinued when an undesirable or unsafe situation arises, such as for example an imminent accident.

In some embodiments, an active suspension system may be used to induce a motion of a vehicle in a desired direction and magnitude to provide a response indicator before a natural motion of a vehicle begins, and/or before the natural motion is completed. The ultimate duration, direction, and extent of a motion induced by the actuator(s) to improve the perceived response of a vehicle may be equal to or greater that the natural response of the vehicle that would have been achieved without the application of the active force(s) by an active suspension system. During a maneuver that involves a turn, the force(s) applied by the active suspension system may at least initially induce roll away from the direction of the turn (i.e., in a positive roll direction). The maneuver may additionally involve fore-aft acceleration, and the induced motion may include pitch in the forward direction.

In certain embodiments, actuators that are used to apply one or more active forces may include, without limitation, electro-hydraulic linear actuators, electro mechanical linear actuators, all linear electric actuators, and/or rotary actuators, such as for example, electro-mechanical, electro-hydraulic, and hydro-mechanical roll bar actuators. In certain embodiments, an active suspension system may include an individual actuator located at or near each wheel of a vehicle. In certain embodiments, each actuator of an active suspension system may couple each wheel of a vehicle to the vehicle body.

In some embodiments, the natural response of a vehicle may be characterized (e.g., predicted, approximated, computed, simulated) using a vehicle simulation that models the effect of factors including, but not limited to, the vehicle and suspension system configuration, the vehicle speed, and the particular command provided to the vehicle. Alternatively, one or more formulas or relationships may be used that relate the natural response of the vehicle to the command. Additionally or alternatively, the natural response of the vehicle may be based, at least partially, on previously collected and/or calculated data. Additionally or alternatively, the natural response of the vehicle may be based on measured quantities that are not affected by the motions induced by the active suspension, such as, for example, a yaw rate sensor or a lateral acceleration measured at or near the roll center of the vehicle.

In certain embodiments, a controlled vehicle may have access to a locally and/or remotely stored first database. The first database may be used to define the natural response of a desired target vehicle which the controlled vehicle is to partially or fully emulate. This first database may include various data for the desired target vehicle. In certain embodiments, the first database may include data for a plurality of target vehicles, and a desired target vehicle may be selected by the manufacturer of the vehicle, the owner of the vehicle, a vehicle occupant, a vehicle driver, a service person or any other person with authorized access to the vehicle. In some embodiments, various choices may be presented to an operator (e.g., via a display located in the dashboard of the vehicle) of the vehicle (e.g., the manufacturer, the owner, a vehicle occupant, a vehicle driver, a service person or any other person with authorized access to the vehicle), and the operator may be able to select the desired target vehicle whose response is to be emulated.

Information stored in the first database may include, without limitation, response data of the target vehicle such as start of vehicle roll, pitch, and/or heave, the rate of vehicle roll, pitch, and heave, the acceleration of vehicle roll, pitch, and heave, and the front to back distribution of these quantities. The response data may be stored as a function of various independent variables, such as for example, vehicle speed and commands given such as, for example, steering wheel angle, rate of change of steering wheel angle, brake pedal position, rate of change of brake pedal position, etc.

Alternatively or additionally, response data defining how the controlled vehicle may respond (e.g., in the absence of active forces applied by the suspension system) may be stored in a second database. The natural response of the controlled vehicle may also be determined in a number of different ways, including empirically by operating the vehicle under various operating conditions and collecting data about its natural response as a function of various driver inputs, such as for example, steering and/or pedal commands. This response information may be collected without the application of active forces and stored in the second database. Alternatively or additionally, the second database may include data characterizing how the controlled vehicle behaved in the absence of active forces in a previous occasion and/or data characterizing how the controlled vehicle behaved in a previous occasion when active forces were applied by the active suspension system. Information stored in the second database may include, without limitation, response data for the controlled vehicle such as start of vehicle roll, pitch, and/or heave, the rate of vehicle roll, pitch, and heave, the acceleration of vehicle roll, pitch, and heave, and the front to back distribution of these quantities. The response data may be stored as a function of various independent variables, such as for example, vehicle speed and commands given such as, for example, steering wheel angle, rate of change of steering wheel angle, brake pedal position, rate of change of brake pedal position, etc. This may include vehicle response data collected on previous occasions.

The first database and/or second database may alternatively or additionally include data about other vehicles similar to the controlled vehicle, such as vehicles of the same model. Based on information contained in the first and/or second databases, the actuators in the controlled vehicle may be operated to improve the apparent responsiveness of the controlled vehicle to more closely approximate or emulate the target vehicle. In certain embodiments, the first database and second database may be stored on non-transitory computer readable memory.

Alternatively or additionally, in certain embodiments, the natural response of the controlled and/or target vehicle may be determined using a numerical model (e.g., an empirically determined model, a bicycle model, a single track model) of the controlled vehicle and/or target vehicle, respectively. A model of a vehicle (also referred to as a "vehicle model") is understood to mean a set of functions, rules, arrays, or combinations thereof, that may define an output response (e.g., motion of a vehicle body) as a function of one or more input commands (e.g., a steering command, an acceleration command, a braking command). Vehicle models, such as those described above, may be obtained empirically by, for example, conducting a sweep test or a steer test, as such tests are known to those of ordinary skill in the art and described in, for example, various ISO (i.e. International Organization for Standardization) standards including ISO 7401, ISO 8725, and ISO 8726. The aforementioned ISO test procedures are provided as non-limiting examples of tests that may be used to develop a model of vehicle response to various commands, and other tests, known to those of ordinary skill in the art, may be envisioned and utilized to develop these models, as the disclosure is not so limited.

In some embodiments, the above noted control concepts may be implemented using a two-model approach as detailed below. With this approach, a first model may be used to characterize (e.g., predict, approximate, simulate, compute) a response of the controlled vehicle to a driver input. The model may receive driver inputs (e.g. steering wheel angle, accelerator pedal position, brake pedal position, rate of change of steering wheel position, etc.), and vehicle state information (e.g. vehicle speed, vehicle acceleration), and vehicle characteristics (e.g. geometry, mass, center of gravity, roll axis) and/or any other appropriate parameter that may be used simulate the response of the vehicle being controlled. This model may for example be a single-track or bicycle model.

Similarly, a second model may be used to characterize (e.g., predict, approximate, simulate, compute) a response of a target vehicle to the same or similar driver input. The second vehicle may, for example, have a faster or more desirable response, as compared to the natural response of the controlled vehicle, in response to the same or similar inputs and under similar or the same operating conditions. For example, the second model may be of a target vehicle having significantly lower yaw inertia, which may lead to the second model having a faster response to steering and or other inputs. In some embodiments, for example, the yaw inertia of the second vehicle may be for example, approximately 50% that of the vehicle being controlled. In other embodiments, the yaw inertia of the target vehicle may be, for example, in the range of approximately 20% to approximately 90% the yaw inertia of the controlled vehicle, as the disclosure is not so limited. The output of the first model and second model may then be used to calculate the difference between the desirable "quicker response" of the target vehicle and the natural response of the controlled vehicle. This difference may be used to determine a compensating active force that would need to be applied to the controlled vehicle, for example, by the active suspension system, in order to approximate, partially or fully emulate, or duplicate the motion of the target vehicle with the controlled vehicle. In this manner, the controlled first vehicle could be made to roll, for example, in the anticipated roll direction as if it was already undergoing sufficient lateral acceleration to cause the roll. Implementing a roll motion in anticipation of and before the occurrence of lateral motion of the vehicle may create a perception of responsiveness in the driver or the same as the driver would experience in the target vehicle under the same conditions.

As a result, the controlled vehicle may undergo roll, pitch, and heave with directions, rates, and/or magnitudes that may match the motions of a well-tuned and responsive target vehicle. This motion can follow one of many patterns determined by the industry as being perceived favorably by the driver or occupants of the vehicle. For example, many passenger vehicles are constructed in such a way as to quickly pitch forward when turning (thus bringing the front end the vehicle down) and also to quickly roll out (bringing the outside of the vehicle down). This combination of forward pitching and outward rolling may lead to a perception of the outside front corner dipping down and "leading" the car into the turn, which has been determined to be perceived by the driver as well controlled. On the other hand, some manufacturers prefer their vehicles constructed in such a way that the front of the car does not dip down, or even such that the front of the car moves up upon entering a turn. It is understood that this disclosure does not preclude such motions if they are deemed favorable to the occupant's perception of the vehicle's steering response or on-center steering behavior. In some embodiments, a forced roll, pitch, or heave response of the controlled vehicle may be followed by a lateral acceleration and yaw response of the vehicle consistent with such roll motion, though with a short delay. In some embodiments the artificially forced responses may be perceptively close in amplitude to the final attitude of the vehicle during a steady-state maneuver, in order to make this effect be comforting and not disconcerting to the driver.

If the response of a controlled vehicle to a steering input seems initially disproportionate and then settles to a perceptively different attitude, it may cause a perception of over-responsiveness that may be undesirable, in that it can make the driver feel less in control of the vehicle. If the active suspension system is capable of affecting the steady-state attitude of the vehicle in any of the out-of-plane directions of motion (heave, pitch, and roll, or any orthogonal set of combinations thereof, such as front, rear, roll, or left, right, pitch), then the final attitude of the vehicle as impacted by the active suspension system may be fine-tuned to closely approximate the amplitude and direction to the transient forced response.

In some embodiments, if the suspension system is not capable of affecting the steady-state attitude of the vehicle, or in cases where this is not desirable (such as, for example, in suspension systems that must consume substantial power in order to do so), then the transient forced response may be shaped in such a way that it approximates the final attitude of the controlled vehicle's natural response after the transient forced response is complete.

For example, in some embodiments the final roll and pitch position of the controlled vehicle in absence of the active suspension intervention (i.e., its natural response) may be characterized, and the transient forced response may be shaped to place the vehicle in the same or similar final roll and pitch position as the natural response, but with a rate faster than would be achieved by the natural response in the absence of any active intervention. In certain embodiments, once the controlled vehicle reaches the final roll and pitch position, active forces may be gradually reduced so that only the natural response remains. In this way, the perception to the driver is that of a vehicle that, in response to a steering input, reaches its natural final attitude much faster than the base vehicle, while reaching the same final attitude. Therefore, as a result of a given maneuver the controlled vehicle attains a final attitude that does not feel perceptively different from that of the natural response vehicle, except that it is achieved more rapidly.

The difference in motion between the actual controlled vehicle and a modeled, faster target vehicle can be used to create a pattern of motion. Inventors have discovered that by targeting the behavior of a more responsive target vehicle, the controlled vehicle, with the intervention of an active suspension system, can be made to feel more responsive than it actually is while still feeling "realistic" and natural.

As described above, this pattern influences the driver's perception of the quality of the vehicle, and can thus be used to fine-tune the desired response. A typical vehicle has three in-plane degrees of freedom (longitudinal, lateral, and yaw) and three out-of-plane degrees of freedom (which can be decomposed into heave, roll, and pitch for example).

In some embodiments, the pattern of motion may be chosen such that a first corner (e.g., the inside rear corner) of the controlled vehicle does not move in the vertical direction, thus reducing the pattern to just two distinct degrees of freedom that can be decomposed into a roll and a pitch about the first corner (e.g., the inside rear corner). With this pattern, it is then possible to fine-tune the behavior by scaling the two degrees of freedom to create a harmonic, predictable motion that is pleasing and reassuring to the driver. For example, in FIG. 1, where the vehicle is turning right 9, the vertical motion of the left rear corner 5 may be limited while the rest of the vehicle rolls about the roll axis 3 in the positive direction. As a result, the right rear corner 6 rises while the left front corner 4 dips.

By using an active suspension system the instantaneous roll angle of a controlled vehicle may be shifted to produce the desired amount of relative dip or rise at the four corners of a vehicle.

In some embodiments, in dynamic driving situations a desired motion of a controlled vehicle may be induced to create loading and unloading of certain tires. For example, without wishing to be bound to any particular theory, rolling the vehicle onto the front outside corner may cause an instantaneous unweighting of that corner while the vehicle is accelerating through a turn, followed by a significant increase in the traction on that corner's tire when the vehicle stops accelerating. This may be due to the fact that in order to create a vertical acceleration of the vehicle body, a force must be applied to it (e.g., by the suspension). Thus, if the vehicle body is accelerating toward a tire, this indicates that the tire may be unweighted. In order to then slow down the motion of the vehicle body in the vertical direction, a force directed vertically toward the vehicle body may be applied which would increase the loading on the tire. In the example of the pattern described above, whereby upon the driver's input an active suspension accelerates the vehicle body in the vertical direction toward the front outside corner, that corner will at first be unweighted and then weighted with more force, thus creating more traction. This may significantly affect the turn-in response of the vehicle and can be used to create a more dynamic desired response; for example increased traction in an outside front tire shortly after the initial steering input.

An aspect of some embodiments is the effect, not only on the driver, but also on the passengers. The perceived responsiveness of the vehicle extends also to the passenger in a driven or autonomous vehicle. This can have two effects. A passenger that is paying attention and attempting to anticipate the motion of the vehicle may feel comforted by the increased responsiveness just as much as the driver is, while a passenger that is not paying attention and is thus not expecting any reaction from the vehicle may, on the contrary, prefer a vehicle that would be perceived by the driver as lacking response, since this will equate with less motion input on the non-attentive passenger. The present invention could thus be used to create a desirable effect for the driver in some modes, for example when the vehicle is controlled by the driver, and create a desirable effect for the non-driving occupants in other modes, for example when the vehicle is self-driving or chauffeur-driven.

This disclosure does not only relate to cornering and on-center steering, but can also be applied to brake pedal response, and accelerator pedal response. It may also apply to other functions the driver performs in the car, and where the vehicle anticipates what the driver expects or prefers as a response from the vehicle in terms of vehicle body motion and at least partially provides that response by using active force in response to driver inputs.

Figure 3:
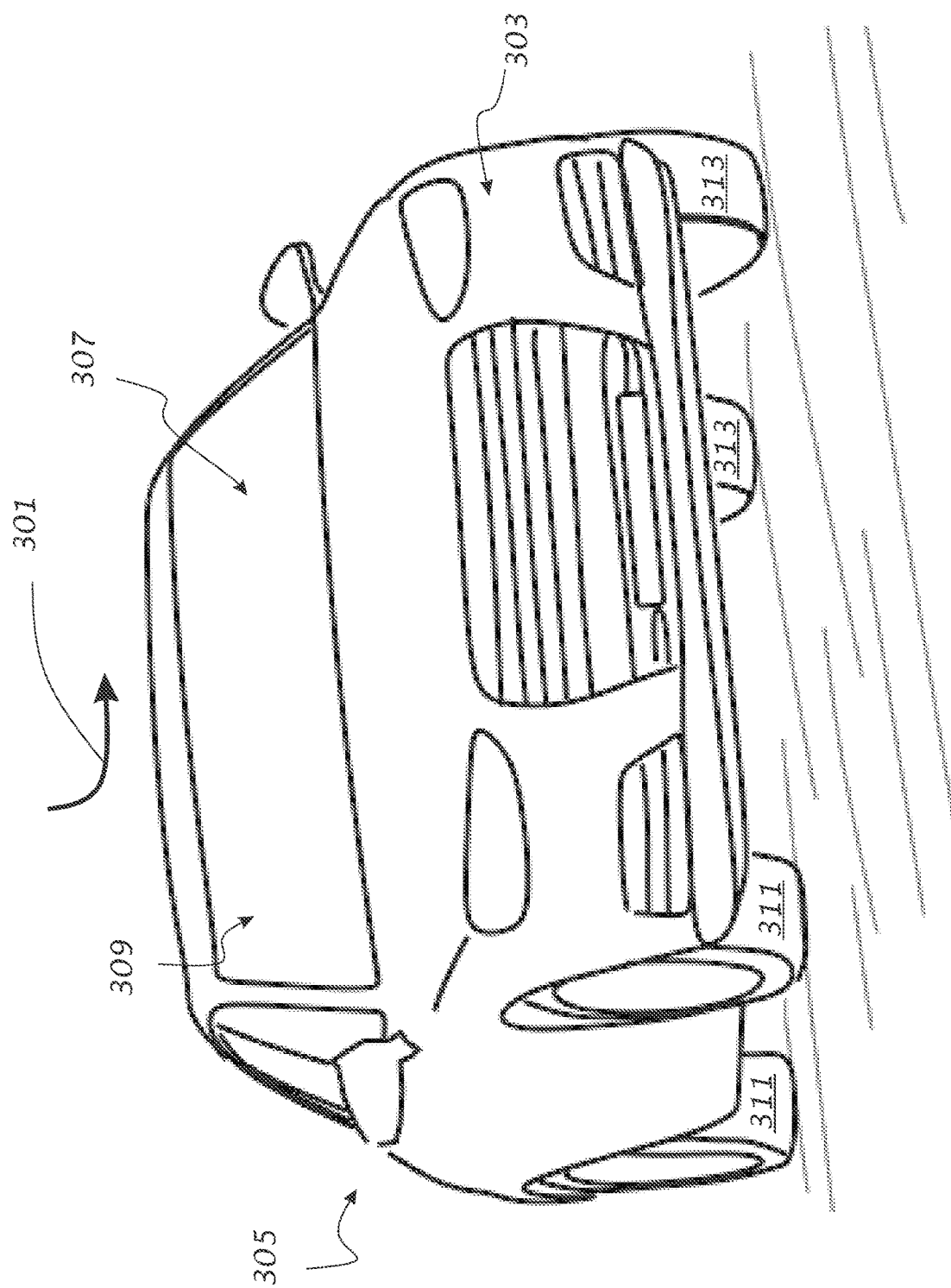
FIG. 3 shows illustrates a schematic of the front view of a vehicle responding to a steering angle input.

FIG. 3 illustrates a schematic of a vehicle during a cornering maneuver. In the drawing, the vehicle is cornering to the left 301 from the driver's perspective, and moving from left to right in the drawing. As is apparent in the figure, a given passenger vehicle in this situation may naturally be leaning forward (meaning the front of the vehicle 303 is lower than the rear of the vehicle 305) and rolling away (meaning the right/passenger side of the vehicle 309 in this case is lower than the left/driver side 307). This is a typical behavior of certain well-tuned vehicles, but is also shaped by manufacturer's preferences and may be not true for all vehicles. One pattern of motion is not necessarily preferred.

For the exemplary leftward cornering illustrated in FIG. 3, the normal force on the tires may be increased for tires on the outside of the turn 311 and decreased for tires on the inside of the turn 313 (the left/driver side in this case). This effect is typically referred to as lateral load transfer. There is also a component of force due to the accelerations of the vehicle body, which adds to the lateral load transfer components.

Figure 4:
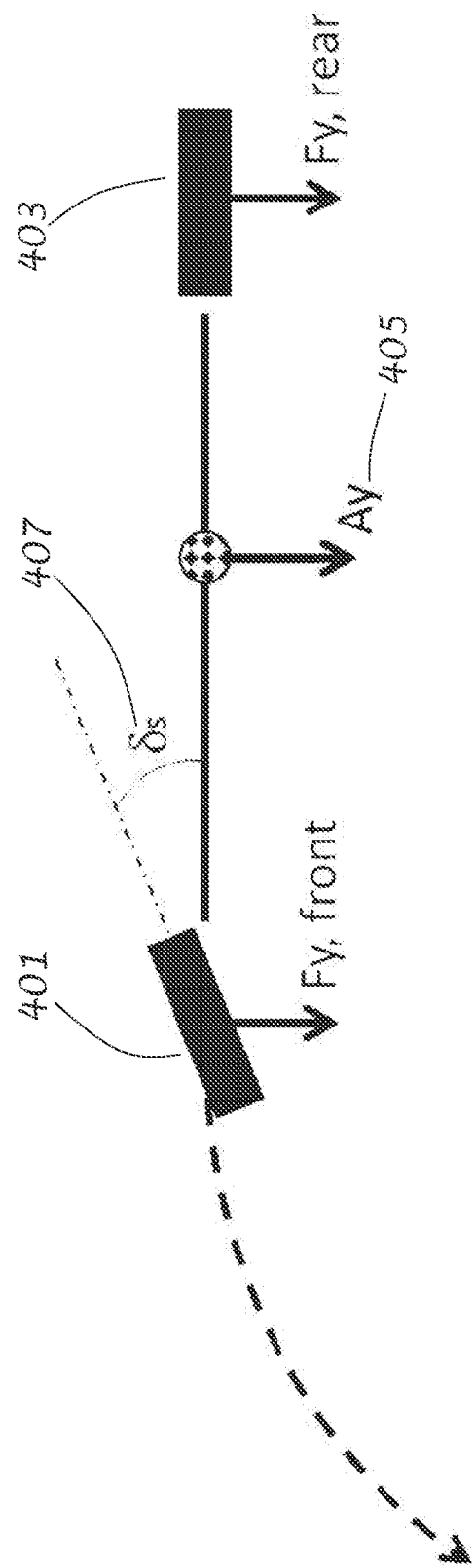
FIG. 4 is a schematic representation of an embodiment of a bicycle model.

FIG. 4 illustrates an exemplary schematic of a simple bicycle model. A bicycle model is also often called a "single track" model since it represents the vehicle as if the front wheels were both collapsed into a first single wheel 401, and the rear wheels were collapsed into a second single wheel 403. The front wheels 401 respond to a steering angle input, and the vehicle is represented as having a mass and a moment of inertia. In some embodiments the rear wheels 403 may also steer or may not steer as the disclosure is not so limited. The simplest version of this model uses four states to represent the dynamics of the model. Typically these are the lateral acceleration 405 and the yaw rate of the vehicle and the lateral velocity and yaw angle, though other combinations of states may be chosen, and the vehicle is assumed to have constant forward speed at any given time. Slightly more complicated versions of the bicycle model may have six states, including a tire lag parameter that represents the low-pass nature of tire force build-up, and more complicated models can have in excess of 20 states that include roll behavior, engine mass behavior, and other details.

The basic principle of the bicycle model is to use the forward speed as a steady-state input, and calculate the lateral acceleration and yaw rate dynamics as a function of a steering angle input 407. Typical parameters required for the vehicle are the vehicle mass, yaw moment of inertia, front and rear cornering compliances, and geometric information about the location of the center of gravity, the desired output point, and the wheelbase of the vehicle.

Often these bicycle models can be improved through the use of Kalman filtering of the parameters by using the measured lateral acceleration and yaw rate of the vehicle as "corrector" signals.

Figure 5:
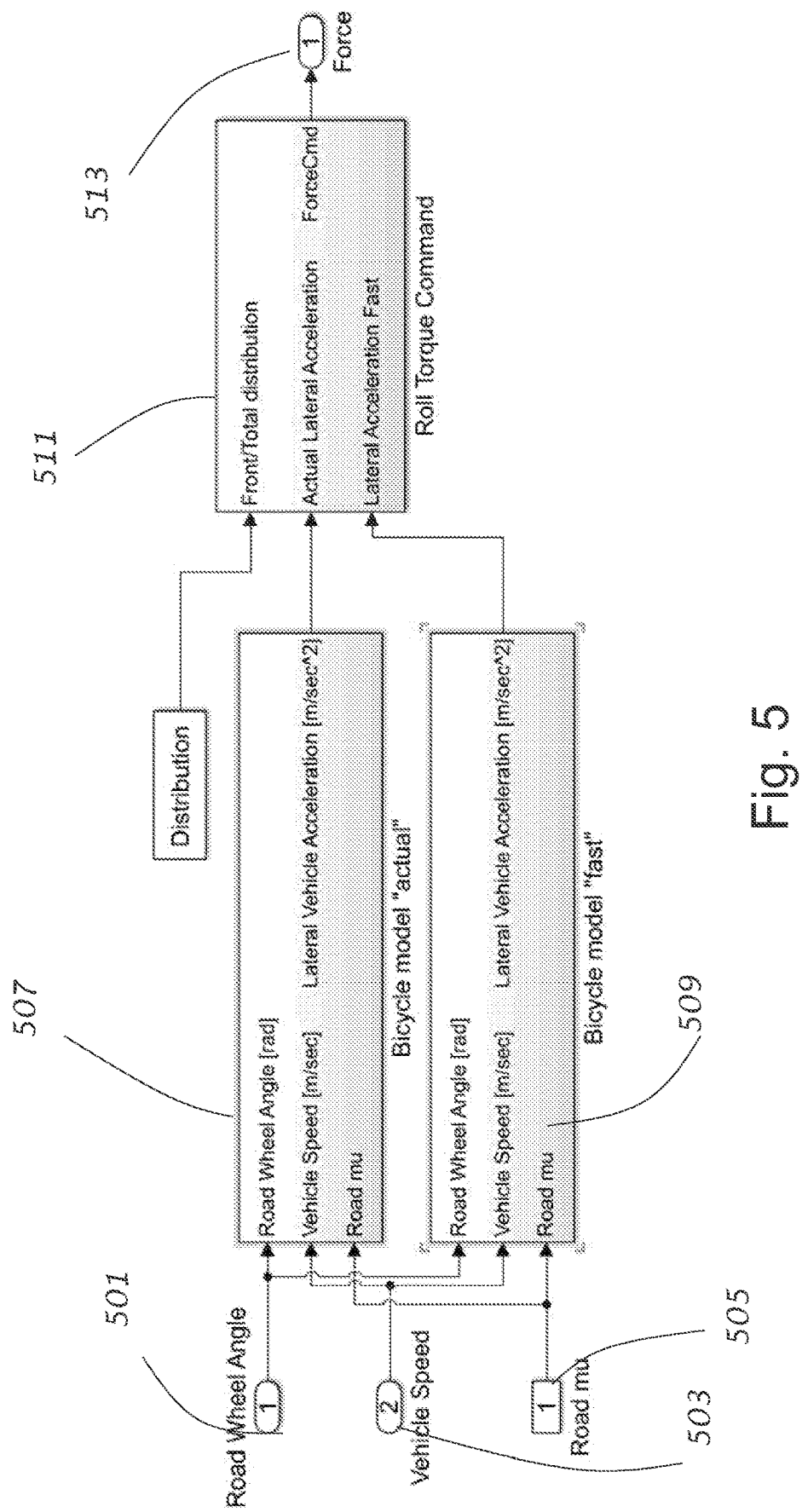
FIG. 5 is a high level block diagram of an embodiment of a controller algorithm for controlling vehicle response to a driver input.

FIG. 5 shows a block diagram of an example of a high level algorithm. The road wheel steering angle 501, which is a function of the steering angle, measured on the vehicle, the vehicle's forward speed 503, and an estimate of the road surface friction coefficient 505 are fed into two separate bicycle model representations 507 and 509. The first bicycle model 507 represents a model that tracks the approximate natural response of the controlled vehicle, while the second model 509 approximates the natural response of a faster responding target vehicle that in some embodiments may have the same or similar steady-state characteristics. The lateral acceleration calculated by the two models is then supplied to an algorithm block 511 that calculates the force 513 to apply to the vehicle body by the active suspension system.

Figure 6:
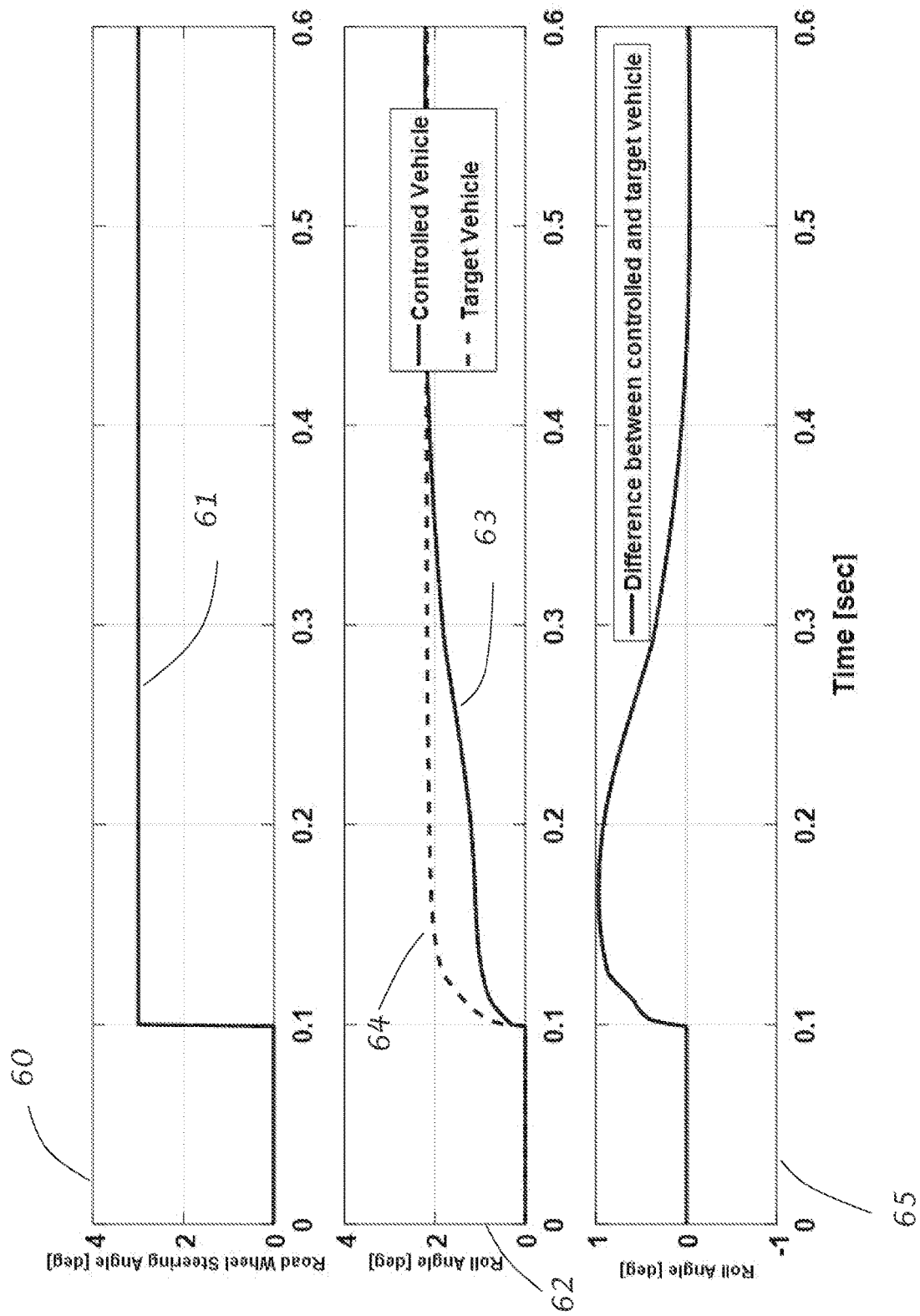
FIG. 6 is a graph of a model output for a controlled vehicle and a more responsive target vehicle responding to a step change in steering wheel input.

FIG. 6 illustrates the output of the two models in FIG. 5 in response, under a given operating condition, to a step steering wheel input 61 of three degrees of road wheel steering angle (or three degrees of angle of the front wheels with respect to the vehicle's longitudinal direction). The top plot 60 shows the input steering angle with a step change from an angle of 0 to an angle of 3 degrees at time t=0.2 seconds. The second 62 plot shows two distinct traces: the roll angle in degrees (which is a function of lateral acceleration) calculated by the first model 63 that simulates the controlled vehicle, and the roll angle in degrees 64 (which is a function of lateral acceleration) calculated by the second faster response target vehicle model. The bottom plot 65 shows the difference between the two signals in the second plot. As can be seen from the graphs, the actual vehicle in this example takes approximately 350 milli-seconds to build up roll angle (or lateral acceleration) in response to the input, while the "faster" model builds up roll angle (or lateral acceleration) in only 20 milli-seconds in this case. Comparing the two signals results in a signal that peaks about 20 ms after the input, and settles out to 0 after about 500 ms. In this case, this means that the two models have the same steady-state response, as described previously. In certain embodiments, a controller may command one or more active suspension system actuators to apply one or more active forces over an appropriate time interval to resemble or duplicate the target response shown in FIG. 6.

Figure 7:
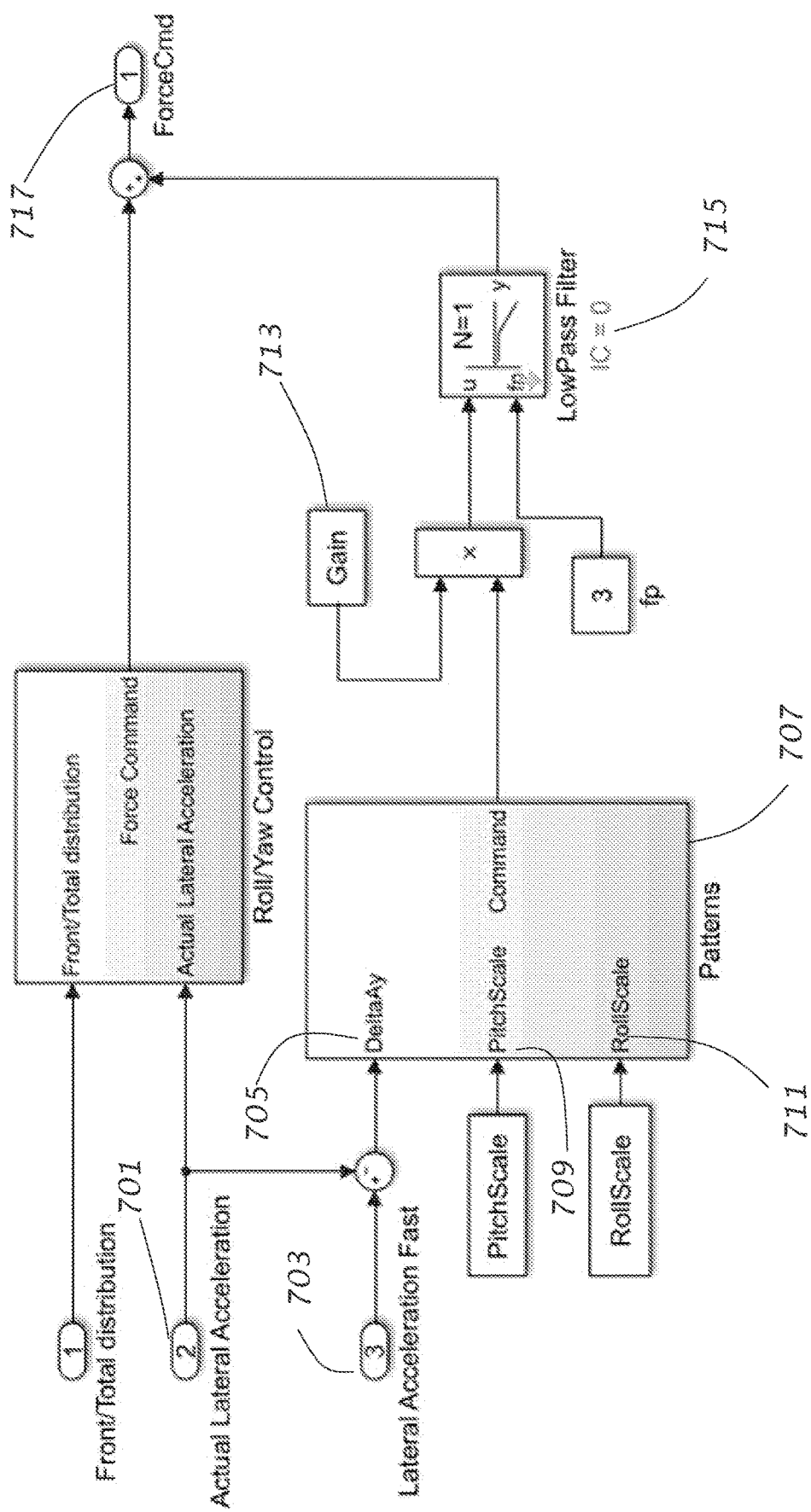
FIG. 7 illustrates a schematic block diagram of a roll force command algorithm.

FIG. 7 illustrates a schematic block diagram of a roll force command algorithm. The model of the controlled vehicle calculates an actual lateral acceleration 701, which could for example be used for roll and yaw control in an active suspension vehicle, and the model of the "faster" target vehicle calculates its own lateral acceleration 703. As described above, the two signals are used to calculate a difference signal 705, labeled "DeltaAy". This signal is in turn used as an input into a pattern algorithm 707 that may also taker additional inputs such as, for example, a scale factor to apply to the pitch component of the pattern 709, and a scale factor to apply to the roll component of the motion pattern 711. The resulting force command is then scaled by an overall gain 713 (used mainly for tunability of the algorithm), and fed through a low-pass filter 715 to reduce high-frequency noise in the output signal 717.

Figure 8:
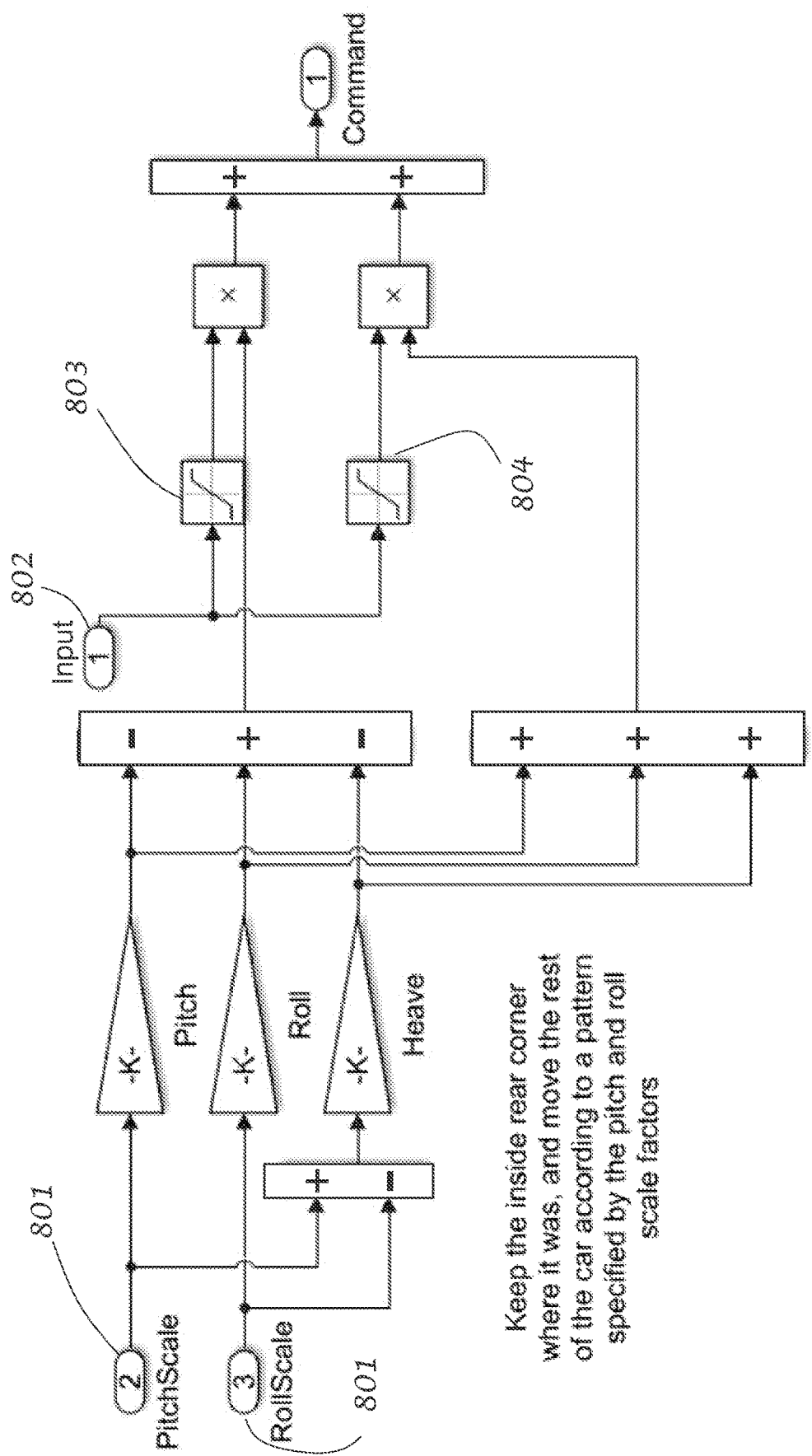
FIG. 8 illustrates an example of an embodiment of an algorithm used to calculate a desired motion pattern in response to a given input.

FIG. 8 illustrates an example of an embodiment of an algorithm used to calculate a desired motion pattern in response to a given input. In this embodiment, as described here, the patterns were modeled such that the inside rear corner of the vehicle is not commanded to move, thus resulting in only two degrees of freedom of motion of the vehicle that are scaled by the two respective scale factors 801. Since the motion pattern is asymmetric with respect to the input 802 (when turning left, the left rear corner may not be commanded to move in the vertical direction, but when turning right, the right rear may not be commanded to move in the vertical direction), two cases of left and right turn are treated separately. The input 802 in some embodiments may be, for example, the signal shown in plot 65 of FIG. 6. In some embodiments, the asymmetric response may be accomplished by using a positive signal saturation block 802 and negative signal saturation block 803 to separate out the two cases, and sum the resulting force commands. In certain embodiments, positive input may occur when the predicted movement of the target vehicle is greater than the movement of the controlled vehicle (which may be, for example, based on predicted, computed and/or measured information). Negative input occurs when the predicted movement of the target vehicle is less than the movement of the controlled vehicle. Thus, for positive input, one of the branches of the calculated force will command a "positive input pattern" and the other will command nothing, resulting in a sum equal to the "positive input pattern." A similar reasoning applies to negative input. It is noted that FIGS. 5, 7 and 8 were generated by using the Simulink tool, which is a graphical programming environment for modeling dynamic systems. Simulink is a product of MathWorks which is located in Natick, Mass., USA.

We claim:

1. A method for controlling a forced response of a vehicle body of a controlled vehicle to a particular command, the method comprising:
   (a) receiving the particular command to perform a first maneuver with the controlled vehicle, wherein the particular command comprises at least one of: a steering command, a braking command, and an acceleration command;
   (b) determining, based on the particular command, a particular target vehicle body response having a particular set of target aspects, wherein the particular set of target aspects comprises at least one of: a target direction, a target magnitude, a target rate;
   (c) determining, based on the particular target vehicle body response, a first active force; and
   (d) applying, to the vehicle body by one or more active suspension actuators, the first active force.

2. The method of claim 1, wherein the forced response comprises motion having an active direction equal to the direction of the particular target vehicle body response.

3. The method of claim 2, wherein the forced response comprises motion having an active rate equal to the rate of the particular target vehicle body response.

4. The method of claim 2, wherein the forced response comprises motion having an active magnitude equal to the magnitude of the particular target vehicle body response.

5. The method of claim 1, wherein step (b) comprises:
   obtaining a model of a target vehicle comprising a target vehicle body, the model defining a target response of the target vehicle body as a function of at least one of: a reference steering command, a reference acceleration command, a reference braking command; and
   computing the particular target vehicle body response by evaluating the particular command against the model.

6. The method of claim 5, wherein the target vehicle has a passive or semi-active suspension system.

7. The method of claim 5, wherein the target vehicle has a first yaw inertia and the controlled vehicle has a second yaw inertia larger than the first yaw inertia.

8. The method of claim 5, wherein step (c) comprises:
   determining a natural response to the command, wherein the natural response has a second set of aspects comprising at least one of: a natural direction, a natural magnitude, a natural target rate;
   computing a difference between an aspect of the second set and an aspect of the first set; and
   determining, based on the difference, the first force.

9. The method of claim 8, wherein step (b) comprises:
   determining a natural rate of the natural response;
   wherein the forced response has a rate faster than the natural rate.

10. The method of claim 8, wherein step (b) comprises:
    determining a natural magnitude of the natural response;
    wherein the forced response has a magnitude at least one of: equal to the natural magnitude, larger than the natural magnitude.

11. The method of claim 8, wherein the first maneuver comprises a turn in a turning direction and the natural response includes roll away from the turning direction.

12. The method of claim 8, wherein the first maneuver involves braking and the natural response is pitch in the forward direction.

13. The method of claim 5, wherein the target vehicle is a virtual vehicle.

14. The method of claim 1, wherein the first maneuver has a duration lasting from a first point in time to a second point in time, the method further comprising:
    discontinuing application of the first force at a third point in time, wherein the third point is later than the first point and earlier than the second point.

15. A method for controlling a forced response of a body of a vehicle to a steering command, the method comprising:
    rotating a steering wheel of a vehicle to a first position at a first rate of rotation;
    determining, based on at least one of the first position and the first rate, a first active force;
    applying, to the vehicle body by one or more active suspension actuators, the first active force.

16. The method of claim 15, wherein rotating the steering wheel causes the vehicle to turn left, and wherein the first force is a torque having a clockwise direction.

17. The method of claim 15, wherein rotating the steering wheel causes the vehicle to turn right, and wherein the first force is a torque having a counter clockwise direction.

18. A method for controlling a forced response of a body of a vehicle to an acceleration command, the method comprising:
    changing the position of a pedal of the vehicle from a first position to a second position at a first rate of change, wherein the pedal is one of: an acceleration pedal, a brake pedal;
    determining, based on at least one of the first position, the second position, and the first rate, a first active force; and
    applying, to the vehicle body by one or more active suspension actuators, the first active force.

19. The method of claim 18, wherein changing the position of the pedal causes the vehicle to accelerate in a forward direction, wherein the first force causes a rear end of the vehicle to lower vertically with respect to a front end of the vehicle.

20. The method of claim 18, wherein changing the position of the pedal causes the vehicle to deaccelerate in a forward direction, wherein the first force causes a front end of the vehicle to lower vertically with respect to a rear end of the vehicle.

* * * * *